July 8, 1969  B. CRETIN MAITENAZ  3,454,331
OPTICAL APPARATUS FOR USE IN FITTING SPECTACLES ON PATIENT
Filed April 13, 1965

United States Patent Office 3,454,331
Patented July 8, 1969

3,454,331
OPTICAL APPARATUS FOR USE IN FITTING SPECTACLES ON PATIENT
Bernard Cretin Maitenaz, Joinville-le-Pont, France, assignor to Societe des Lunetiers Cottet, Poichet, Temkine & Cie, Paris, France
Filed Apr. 13, 1965, Ser. No. 447,768
Claims priority, application France, Apr. 28, 1964, 972,617; Dec. 7, 1964, 997,669
Int. Cl. A61b 3/10
U.S. Cl. 351—5       10 Claims

ABSTRACT OF THE DISCLOSURE

Apparatus for use in fitting lenses in spectacles and fitting spectacles on a patient has a system of lenses and mirrors through which the patient views illuminated targets for close vision and distant vision. A camera is arranged to photograph the spectacles and the patient's face and reflex viewing system permits simultaneous observation by an optician.

---

It has already been proposed to provide a measuring device for adapting the spectacles while being worn, which is characterized by a kind of box equipped with means for illuminating the face of wearer of the spectacles and also with a photographic lens system giving a full-scale image of the wearer's face on a screen reflecting this image by means of a set of mirrors adapted to "fold" the light beam within said box so as to project it onto a quick-developing sensitive film, to permit the full-scale measurement of the relative position of the eyes with respect to the lenses of the spectacle mountings.

The device according to this invention permits of obtaining on the same photo-sensitive film the image of each eye of the user as seen and positioned through the spectacle lenses both under distant-sight and close-sight conditions.

This apparatus comprises a case or box having mounted at the rear thereof the photographic camera or the photosensitive film, and at the front on the one hand a lens system disposed at the point of convergence of the patient's eyes as seen through the two lenses of the spectacles which are directed for close vision and on the other hand a pair of lens systems reflecting the image of the eyes and lenses for infinity vision, as well as mirrors, which may be retractable or semi-reflecting, for "folding" or reflecting the light beams until the photographed image is formed on the photosensitive film.

Under these conditions the photographic film will show pictures of the eyes, spectacle lenses and reference marks both under close-vision and distant-vision conditions.

A simplified arrangement according to this invention comprises, for the close-sight vision, reference marks movable in front of the spectacle lenses carried by the mounting fitted on the user's face, and an observation device disposed in the plane of convergence of the user's sight, which consists of a lens system located in said plane and giving on the photosensitive film an image of the user's eyes through the spectacle lenses and of the reference marks in the observation plane.

The reference mark in front of each spectacle lens may consist of a disc displaceable on the lens by means of a clamp, or a glass carrying etched designs or reference lines, or cross-hairs or spider-lines disposed in the plane of the eye image observed by the optician.

The accessory disposed in front of the image comprises essentially a lens system giving of the lens to be studied a suitably reflected picture so that it can be observed through an eyepiece at the optician's disposal.

The optician may move the movable mark in front of the lens to be studied or the cross-wires, in the plane of the image, until the pupil is coincident with the proper reference mark.

Various forms of embodiment of the apparatus of this invention will now be described with reference to the attached drawings in which.

Figure 1:
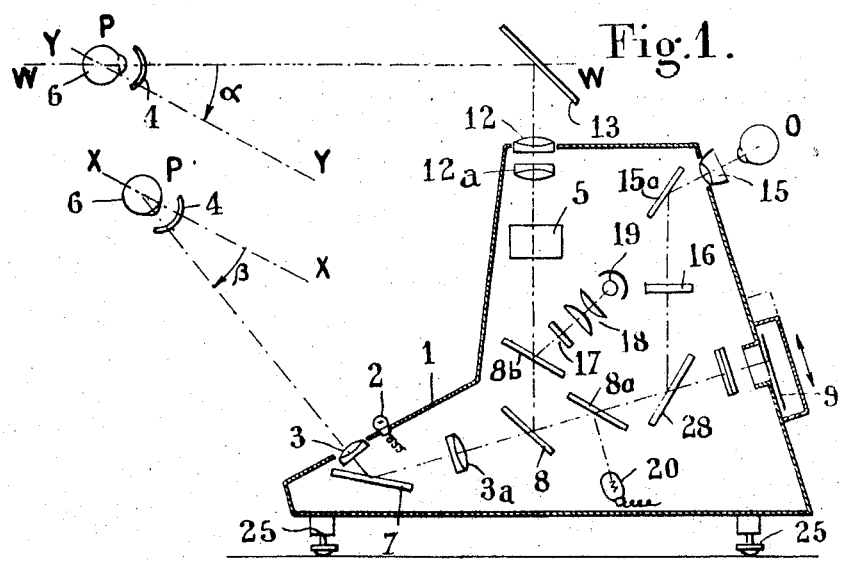
FIGURE 1 is a diagrammatic general view of the device.
Figure 2:
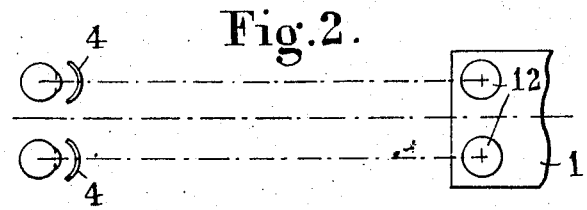
FIGURE 2 is a fragmentary plan view of the same apparatus.

An apparatus of reduced over-all dimensions shown in FIGURE 1 comprises essentially a case 1 with a light source 2 and a lens system 3 disposed at the point of convergence of the two eyes 6 of the patient, in front of which the spectacle mounting to be adjusted is laid, with its lenses 4.

This lens system 3 comprise two elements 3, 3a with a view to adjusting the magnification of the resulting image.

Figure 3:
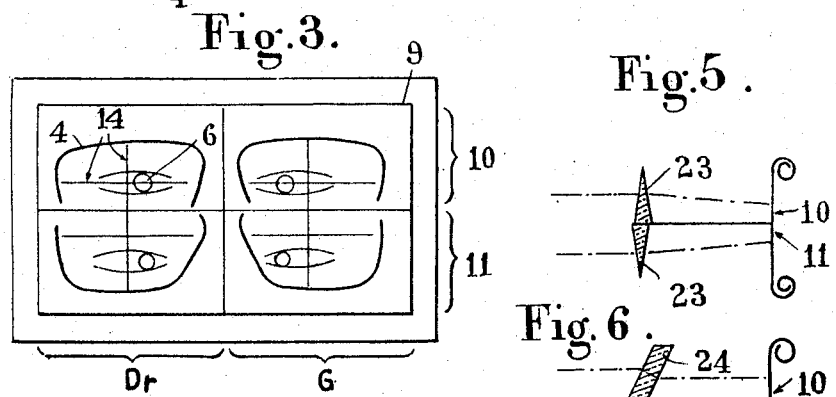
FIGURE 3 illustrates the double image thus obtained.

The image produced by the lens system 3 is reflected by the mirror 7 onto the photographic camera or sensitive film 9 which it impinges on the lower half 11 (FIGURE 3).

This sighting operation corresponds to close-vision conditions shown by the lowered position of the eye 6 and forming an angle $\beta$ with the optical axis X—X of the lens.

The sighting under distant-vision conditions corresponds to a position of the eye wherein the axis thereof merges substantially into the optical axis W—W of lens 4.

To effect this distant-vision sighting there are provided a pair of lens systems 12 having a variable or adjustable line of centers (FIGURE 4) which are mounted on the top of the box or case in order to provide an image reflected by the mirror 13 and also by the mirror 8 onto the upper portion 10 of the photosensitive film 9 (FIGURE 3).

Thus the position of the eyes 6 in relation to the spectacle lenses 4 and to the reference marks 14 for both distant and close vision may be easily compared on the same photograph.

The instantaneous developing photographic camera 9, for example of the "Polaroid" type, is displaceable in such a manner that one can see on area 10 (FIGURE 3) the relative position of the eyes and spectacle lens under distant-vision conditions, and on area 11 the close-vision position.

Figure 4:
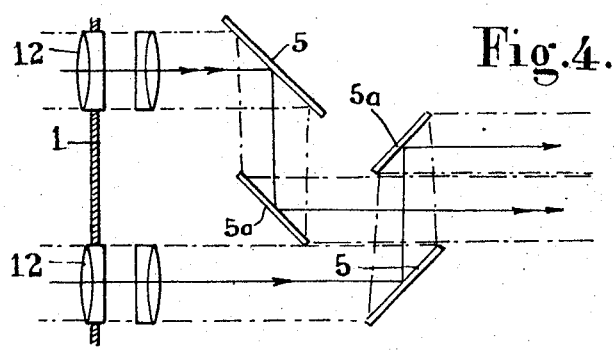
FIGURE 4 is a schematic view which illustrates the correction of the light beam.

Due to the fact that the distant-vision photograph is the juxtaposition of two different photographs taken through each lens sysem 12, some means must be provided for mutually reversing the left-hand (G) and right-hand (Dr) positions by resorting for example to a prism or mirror arrangement as illustrated in FIGURE 4 along the image beams issuing from the lens systems 12 corresponding to the two sightings.

The necessary centering of the patient (P) with respect to the relatively reduced field of the film may be effected by using either a conventional view-finder or a reflex viewfinder as illustrated (FIGURE 1), the optician (O) observing through an eyepiece 15 and by a mirror 15a the image of P which is formed on the reticle 16; this applies to both distant-vision and close-vision conditions, since the light beams are reflected by the same mirror 28.

In order to fix the patient's sight to a horizontal position to infinity under distant-vision conditions, light spots 17 may be disposed at the foci of lens systems 12 illuminated through condenser 18 from light sources 19. The position of the patient's eyes under close-vision conditions will be obtained simply through the binocular observation of a reference mark located in the vicinity of the lens system 3 and possible centrally thereof. The picture will be taken preferably with the assistance of flash lamps 20 directing their beams along the sighting axes either under close-vision conditions or distant-vision conditions.

The various arrangements set forth hereinabove require the use of mirrors 8, 8a, 8b, 28 having reflecting or semi-reflecting surfaces, with means for retracting the mirrors from the field, to permit the normal synchronization of the various functions contemplated.

Figure 5:
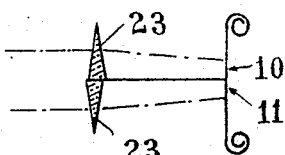
FIGURES 5 and 6 are schematic views showing the devices for moving the images of the two eyes toward each other.
Figure 6:
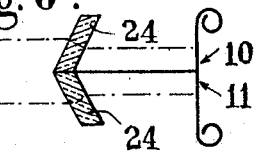

In order to take advantage of an instantaneously-developed film size now available on the market, the images of the left-hand and right-hand eyes should be brought closer together as shown in FIGURE 3. This may be obtained under distant-vision conditions by using a set of mirrors 5, 5a as illustrated in FIGURE 4. The same result may be obtained under close-vision conditions by using for example paired prisms 23 or relatively thick oblique blades 24 adapted to "bend" each beam in an opposite direction (FIGURES 5 and 6).

Adjustable legs 25 may be provided to permit the proper vertical adjustment of the apparatus at the level of the patient's eyes P, or alternatively the mirror 13 may be adapted to be adjusted vertically and in this case the lens system 12, 12a must be separated, one element 12 of this assembly accompanying the mirror during its upward movement in order not to bring any change in the sharpness and magnification conditions.

If desired, the apparatus may be provided with test patterns 17 (such as letters, designs, numerals) located at the focus of the lens system 12, 12a to permit the measurement or the valuation of the monocular or binocular visual acuity of the patient P under distant-vision conditions.

In order to compensate or measure ametropia, complementary arrangements may be contemplated whereby the tests or optotypes 17 will move along the optical axis in order to give variable images of infinity up to the patient's remotum. Graduations connected to the movements of 17 will permit the measurement of compensated ametropia. Furthermore, dissporameters or adjustable prisms may be disposed across the lens systems 12 so that the optician, by using blue or red filters or Polaroid filters, may determine the phorias of the patient being examined.

Similarly, the fixation points 17 for distant vision as well as the flash lamps 20 for producing an instantaneous and strong illumination when taking the photograph are shown and described as being mounted within the apparatus; however, these elements may be disposed externally thereof at any locations giving a result corresponding to the above description.

For juxtaposing the distant-vision and close-vision photographs, means may be provided (as shown in FIGURE 1) for moving the dark slide of the photographic camera 9 while retracting, of course, some of the mirrors, if necessary or on the contrary providing non-superopsed beams impinging respectively on the film areas intended therefor. It may be noted that the displacement of the camera as shown in FIGURE 1 permits recording on the same film either for the same patient the distant vision and the close vision, or one of these visions for two successive customers, this being particularly economical in that the film cost is reduced by one-half in this case.

The resulting photographs are read directly by measuring the relative spacing between the corneal reflection of the beam emitted from the light source and the design carried by the lenses fitted on the mounting, or between said reflection and the design obtained by superposing the lens cutting gauges corresponding to the inner contour of the photographed mounting. The centering by the reflex view-finder 15, 15a, 16, 28 will be preferred to the conventional direct view-finder, for its arrangement will permit an ocular checking when delivering the spectacles to the customer, since at that time the optician can sight the full-scale image of the customer with his spectacles on.

The above description of the apparatus refers to the use of "Polaroid" films. Of course, other photosensitive surfaces may be used within the limits permitted by the illumination values.

By way of simple alternate form of embodiment the photographic camera may be dispensed with while keeping only the reflex view-finder 15 permitting a centering under distant-vision conditions, and also under close-vision conditions, due to the fixed or movable reticles located in the image plane 16.

Figure 7:
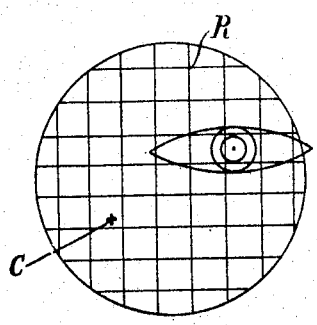

FIGURE 7 shows the fixed reticle R whereby the relative position of the eye and of the center C of the spectacle glass may be determined.

Figure 8:
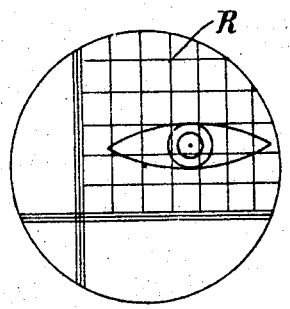

The measurement is facilitated by the use of a movable reticle (FIGURE 8) moved to the center of the glass, for instance.

When the reference marks are carried by the spectacle lenses themselves, the reticle 16 is not necessary and to materialize the axis of the patient's sight movable reference marks may advantageously be used. More precisely, the optician looking through eye piece 15 (FIG. 1) or eye piece 32 (FIG. 13) can see in each eye of the patient a small luminous spot which is the image of luminous sources 2 or 17 (FIG. 1) or 33 (FIG. 13) reflected in the corneas of the patient's eyes. Since the patient aims or stares at one of these luminous sources which are located or almost located on the axis of optical systems of FIGS. 1 and 13, said small luminous spots appear on the cornea where the sight axis of each eye passes through, and the optician merely has to place said movable reference marks on the patient's lenses in front of each said small luminous spots so as to mark the trace of the sight axis on each of said lenses with a minimum parallax error.

Figure 9:
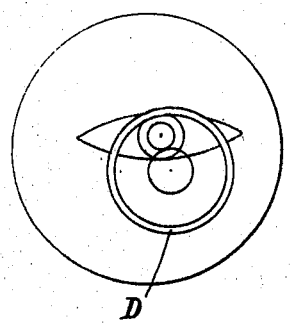
FIGURES 7, 8, 9 and 10 are schematic views which show the image of the eye and the reference means as seen through the optician's eyepiece.
Figure 10:
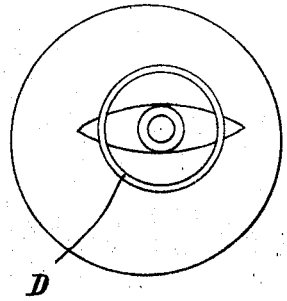
Figure 11:
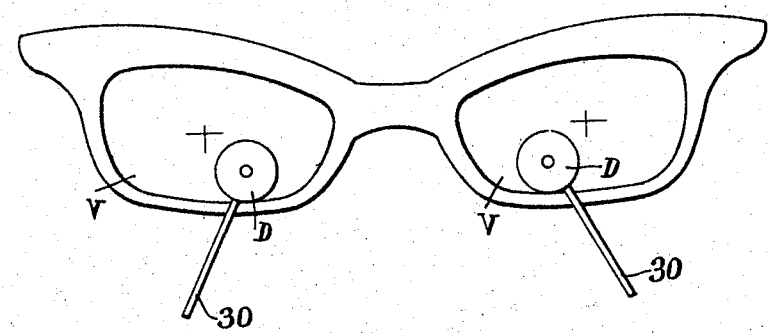
FIGURE 11 is a front view showing the spectacles and the reference means during the examination.
Figure 12:
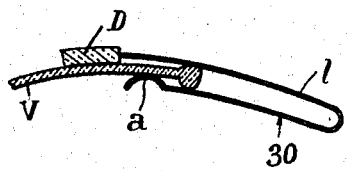
FIGURE 12 is a detail view of the reference means.

From a reference mark not centered on the eye (FIGURE 9) the observer will move this mark until the proper positioning is attained (FIGURE 10) FIGURES 11 and 12 show that these reference marks consist of small transparent disc D clamped on the glass V by means of spring clips 30 used for handling them.

Figure 13:
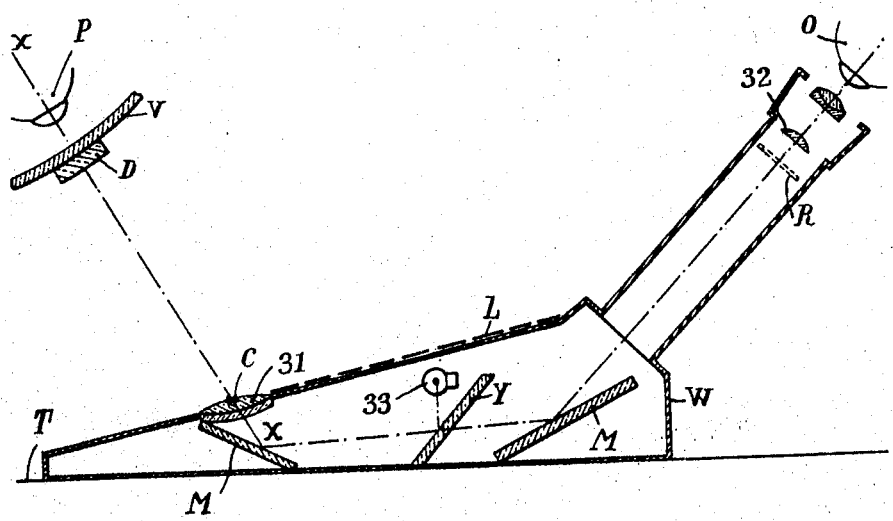
FIGURE 13 is a diagrammatic view of simplified device.

FIGURE 13 shows a simple alternate form of embodiment designed only for close-sight centering. The component elements already described are also found in this arrangement, namely the lens V, the movable reference marks D, the lens system 31 forming the image observed in the eyepiece 32, the point of fixation of the sight (at C) illuminated by the lamp 33. The apparatus further comprises a case W, mirrors M and Y and a reticle R arranged as shown.

This very simple modified form of embodiment is described only to show that according to cases the different functions of the complete apparatus described hereinabove may be used separately or in combination (FIGURE 1).

In order to facilitate the positioning of the patient P a head-rest or chin-rest may be provided as already known, the fine adjustment centering being effected in this case by simply rotating one of the beam-reflecting mirrors.

The use of a chin-rest prevents the patient's head from inclining forward in case of close-vision, as illustrated in FIGURE 1.

In this case the centre of rotation of the patient's eye has only one position from which he will look in a horizontal direction for distant vision and obliquely for close vision.

In order to cause the relative position of the eye and lens to correspond to that shown for the close vision in FIGURE 1, the lens system 3 will be disposed on the line Y—Y corresponding to the angle $\alpha=\beta$ (PX being the direction which a horizontal straight line would take connected to the spectacles during the distant vision PW).

What I claim is:

1. Optical measuring apparatus adapted to locate on the lenses of a patient's spectacles the position of the sight trace of each eye of the patient equipped with the spectacle mounting he has chosen, under close and far vision conditions, comprising in a same casing a first close fixation point to be stared at by the patient under close vision condition, first means for forming by reflection on each cornea of the patient's eyes a small luminous spot located on the patient's sight axis, said first forming means being located in the proximity of said first fixation point, a first optical system the optical axis of which passes through the proximity of said first fixation point, said first optical system comprising at least a lens system disposed at the point of convergence of the patient's eyes staring at said first fixation point, a pair of second fixation points to be stared at by the patient under far vision condition, a pair of second identical optical systems of parallel axis, said two latter axis respectively passing through said second fixation points and being almost collinear with the respective sight axis of each eye of the patient under far vision condition, a pair of second means for forming by reflection on each cornea of the patient's eyes small luminous spot located on the patient's sight axis, each of said second forming means being respectively located on the optical axis of a respective one of said pair of second optical systems, and means for observing and recording successively under close and far vision conditions the combined images composed of the eyes of the patient equipped with its spectacle mounting and of said small luminous spots, which images are respectively given by said first and second optical systems, whereby accurate position of the patient's sight trace on its corrective lenses is obtianed without parallax error under close and far vision conditions.

2. Apparatus according to claim 1 in which each optical system of said pair of second indentical optical systems comprises at least a lens system which provides an up-down inverted image of the corresponding eye and, in connection with the lens system of the other second optical system, an inverted image of the left-hand and right-hand eyes of the patient.

3. Apparatus according to claim 2, in which said replacing means is composed of two pairs of parallel facing mirrors, one pair for each of said lens system, these mirrors being disposed so that the left-hand and the right-hand light beams from each of said lens systems are inverted with respect to each other at the output of said two pairs of mirrors, and the second mirrors of each of said two pairs of parallel facing mirrors being adjustable, so that the spacing of the two light beams at the output of said two pairs of mirrors is adjustable.

4. Apparatus according to claim 2, in which said first fixation point and said first forming means are constituted by a same first light source disposed in the proximity of the axis of said first optical system at the point of convergence of the patient's eyes under close vision condition, and in which there is provided a pair of second light sources, each second light source constituting one fixation point of said pair of second fixation points and a respective forming means of said pair of second forming means, and each second light source being disposed on the optical axis a respective lens system at the focus thereof.

5. Apparatus according to claim 1, in which said recording means are photographic means, and said first optical system and said pair of second optical systems are arranged so that said images are formed in a same plane, the sensitive film of said photographic means being disposed in this image plane.

6. Apparatus according to claim 5, in which there is provided on light path in said first optical system, in front of said photographic means, a pair of deflecting means which approach to each other the two images of the patient's eyes on the sensitive film, so that useful part of the images of each eye under close vision condition may be entirely recorded in the image frame of the film.

7. Apparatus according to claim 6, in which said pair of deflecting means is constituted by a pair of transparent blades of parallel faces, which blades are equally and oppositely inclined with respect to the optical axis of said first opical system.

8. Apparatus according to claim 5, in which there is provided flash means on the respective axis of said first and pair of second optical systems in order to reinforce the light from said first and pair of second forming means, so that said small luminous spots on the corneas may clearly appear on the images recorded on the sensitive film.

9. Apparatus according to claim 1, in which there is provided view-finder means to allow centering of the patient.

10. Apparatus according to claim 9, in which said view finder means is constituted by at least one reflex viewfinder.

References Cited

UNITED STATES PATENTS

| 2,325,569 | 7/1943 | Hancock et al. | 351—5 |
| 2,803,179 | 8/1957 | Donaldson. | |
| 2,884,832 | 5/1959 | Engelmann | 351—5 X |
| 3,205,505 | 9/1965 | Fletcher et al. | 351—32 |

FOREIGN PATENTS

| 1,038,903 | 9/1958 | Germany. |
| 1,129,603 | 9/1956 | France. |
| 625,458 | 3/1963 | Belgium. |

DAVID SCHONBERG, *Primary Examiner.*

P. A. SACHER, *Assistant Examiner.*

U.S. Cl. X.R.

351—7